(12) United States Patent
Koo et al.

(10) Patent No.: US 9,911,998 B2
(45) Date of Patent: Mar. 6, 2018

(54) DEVICE FOR DECREASING HYDROGEN CONCENTRATION OF FUEL CELL SYSTEM

(71) Applicant: Hyundai Motor Company, Seoul (KR)

(72) Inventors: Jinwoo Koo, Seoul (KR); Myung Ju Jung, Daejeon (KR)

(73) Assignee: Hyundai Motor Company, Seoul (KR)

( * ) Notice: Subject to any disclaimer, the term of this patent is extended or adjusted under 35 U.S.C. 154(b) by 65 days.

(21) Appl. No.: 15/252,750

(22) Filed: Aug. 31, 2016

(65) Prior Publication Data

US 2017/0263962 A1 Sep. 14, 2017

(30) Foreign Application Priority Data

Mar. 10, 2016 (KR) ................. 10-2016-0028999

(51) Int. Cl.
| | |
|---|---|
| *H01M 8/0662* | (2016.01) |
| *B01D 53/00* | (2006.01) |
| *H01M 8/04223* | (2016.01) |
| *H01M 8/04119* | (2016.01) |

(52) U.S. Cl.
CPC .......... *H01M 8/0662* (2013.01); *B01D 53/00* (2013.01); *H01M 8/04223* (2013.01); *H01M 8/04141* (2013.01); *H01M 2250/20* (2013.01)

(58) Field of Classification Search
None
See application file for complete search history.

(56) References Cited

U.S. PATENT DOCUMENTS

2009/0197141 A1* 8/2009 Nakakubo ............... B01F 5/061
429/413

* cited by examiner

*Primary Examiner* — Helen O Conley
(74) *Attorney, Agent, or Firm* — Mintz Levin Cohn Ferris Glovsky and Popeo, P.C.; Peter F. Corless (57) ABSTRACT

A device for decreasing hydrogen concentration of a fuel cell system is installed in an exhaust system of a fuel cell system so as to discharge exhaust gas including hydrogen and air from fuel cells to the atmosphere through an exhaust line. The device includes: a catalyst diluter that includes catalysts for diluting hydrogen in the exhaust gas by generating a catalytic reaction, the catalyst diluter being connected to the exhaust line; and an air diluter that is disposed outside the catalyst diluter and guides external air to a gas exit side of the catalyst diluter, in which the catalyst diluter may include a valve unit that opens and closes an external air channel of the air diluter in accordance with flow pressure of the exhaust gas.

20 Claims, 7 Drawing Sheets

DEVICE FOR DECREASING HYDROGEN CONCENTRATION OF FUEL CELL SYSTEM

CROSS-REFERENCE TO RELATED APPLICATION

This application claims under 35 U.S.C. § 119(a) the benefit of Korean Patent Application No. 10-2016-0028999 filed in the Korean Intellectual Property Office on Mar. 10, 2016, the entire contents of which are incorporated herein by reference.

BACKGROUND (a) Technical Field

The present invention relates to an exhaust system of a fuel cell system, and more particularly, to a device for decreasing the concentration of hydrogen discharged to the atmosphere together with air from the fuel cell system.

(b) Description of the Related Art

In general, a fuel cell system generates electrical energy by supplying air and hydrogen to a fuel cell and uses an electrochemical reaction of the hydrogen and oxygen generated by the fuel cell. For example, fuel cell systems are used for operating driving sources such as an electric motor in vehicles, ships, trains, and airplanes.

Fuel cell systems include a stack of fuel cells, a hydrogen supplier that supplies hydrogen to the anodes of the fuel cells, an air supplier that supplies air to the cathodes of the fuel cells, and a heat/water control unit that removes heat and water, which are reaction by-products from the fuel cells, and controls the operational temperature of the stack.

In a polymer electrolyte membrane fuel cell, an appropriate amount of water is required for smooth operation of an ion exchange membrane of a membrane-electrode assembly (MEA), so fuel cell systems have a humidifier that humidifies a reaction gas that is supplied to the stack.

Such a humidifier humidifies air supplied from an air supplier, using water in high-temperature and high-humidity air discharged from the cathodes of fuel cells, and supplies the humidified air to the cathodes of the fuel cells.

Further, fuel cell systems include a hydrogen recycler that mixes the hydrogen discharged from the anodes of fuel cells with the hydrogen supplied from a hydrogen supplier, and supply the mixture back to the anodes.

While a fuel cell system is operated, impurities such as nitrogen and vapor are accumulated in the anodes of fuel cells, so the concentration of hydrogen decreases, and when the concentration of the hydrogen excessively decreases, cell separation may occur in the fuel cell stack.

In order to solve these problems, when a fuel cell system is started and operated, a purge valve periodically opened and impurities are discharged with hydrogen from the anodes, thereby maintaining the concentration of hydrogen at the anodes at a predetermined level or more.

When the anodes are purged by opening the purge valve, the anodes discharge hydrogen with impurities, and a purge gas flows into a humidifier together with the air discharged from the cathodes.

Then, the vapor in the impurities is used as a source for humidifying a reaction gas needed for an electrochemical reaction of the fuel cells, and the gas including hydrogen and nitrogen is discharged with air to the atmosphere through an exhaust system.

Accordingly, according to this hydrogen purge type, the hydrogen discharged from anodes is mixed with the air discharged from the cathodes and then discharged to the atmosphere through an exhaust system, thereby achieving an effect of reducing the concentration of purge hydrogen by diluting the hydrogen with air.

Further, when a fuel cell system is started or stopped or when a fuel cell vehicle equipped with a fuel cell system is in an idling condition (for example, a fuel cell vehicle is in an ISG condition), a large amount of hydrogen crossing over from the anodes to the cathodes of the fuel cells through a membrane is discharged.

The hydrogen is discharged with air to a humidifier from the cathodes of the fuel cells and is diluted with air through the humidifier, so the hydrogen is discharged to the atmosphere through an exhaust system with the concentration reduced.

However, as described above, although in the related art the concentration of hydrogen to be discharged is slightly reduced by mixing the hydrogen with air discharged from cathodes in a humidifier in accordance with the operation conditions of fuel cell systems, it is difficult to sufficiently mix the hydrogen and air, so the concentration of the hydrogen is not remarkably decreased.

Accordingly, in the related art, since the concentration of hydrogen discharged from fuel cell systems is not effectively reduced and there is quite a possibility of discharging hydrogen that has not been diluted, depending on the operation conditions of the fuel cell systems, the discharged hydrogen having concentration over a predetermined level may cause ignition and explosion.

In order to prevent this problem, measures to discharge hydrogen after reducing the concentration of the hydrogen to be discharged through an exhaust system to a predetermined level or less should be necessarily applied to fuel cell systems.

Recently, in order to prevent the possibility of ignition and explosion by hydrogen discharged from fuel cells, the concentration of hydrogen that fuel cell systems discharge to the atmosphere through exhaust systems is regulated less than 8% at the maximum and less than 4% per three seconds on the average by governmental regulations and relevant laws.

The Description of the Related Art is made to help understanding the background of the present invention and may include matters out of the related art known to those skilled in the art.

SUMMARY

The present invention provides a device for decreasing the hydrogen concentration of a fuel cell system having an advantage of being able to effectively reduce the hydrogen concentration in an exhaust gas discharged to the atmosphere through an exhaust system of the fuel cell system, using a catalyst and external air, and to satisfy the laws and regulations governing hydrogen discharge from fuel cell vehicles.

Further, exemplary embodiments of the present invention provide a device for decreasing hydrogen concentration of a fuel cell system that can prevent an increase in differential pressure in an air supply system and reduce the amount of a catalyst that is unnecessarily used.

According to an embodiment of the present invention, a device for decreasing hydrogen concentration of a fuel cell system, which is installed in an exhaust system of a fuel cell system so as to discharge exhaust gas including hydrogen and air from fuel cells to the atmosphere through an exhaust line, includes: a catalyst diluter that includes catalysts for diluting hydrogen in the exhaust gas by generating a catalytic reaction and is connected to the exhaust line; and an air diluter that is disposed outside the catalyst diluter and guides external air to a gas exit side of the catalyst diluter, in which the catalyst diluter may include a valve unit that opens and closes an external air channel of the air diluter in accordance with flow pressure of the exhaust gas.

Further, in the device for decreasing hydrogen concentration of a fuel cell system according to an exemplary embodiment of the present invention, the valve unit may be integrated with the catalysts.

Further, in the device for decreasing hydrogen concentration of a fuel cell system according to an exemplary embodiment of the present invention, the catalyst diluter may include a first pipe member providing a first channel for the exhaust gas to flow.

Further, in the device for decreasing hydrogen concentration of a fuel cell system according to an exemplary embodiment of the present invention, the air diluter may include a second pipe member providing a second channel for external air to flow between the first pipe member and the second pipe member, with the first pipe member at the center portion therein.

Further, in the device for decreasing hydrogen concentration of a fuel cell system according to an exemplary embodiment of the present invention, the first and second pipe members may form a coaxial dual pipe.

Further, for the device for decreasing hydrogen concentration of a fuel cell system according to an exemplary embodiment of the present invention, in the first pipe member and the second pipe member, the second channel may be formed between an outer side of the first pipe member and an inner side of the second pipe member.

Further, in the device for decreasing hydrogen concentration of a fuel cell system according to an exemplary embodiment of the present invention, when the exhaust gas is discharged from a front side to a rear side through the exhaust line, the catalyst diluter and the air diluter may be disposed in a predetermined section close to a rear end of the exhaust line.

Further, in the device for decreasing hydrogen concentration of a fuel cell system according to an exemplary embodiment of the present invention, when the exhaust gas is discharged from a front side to a rear side through the exhaust line, the catalyst diluter and the air diluter may be integrally formed and disposed at a rear end of the exhaust line.

Further, in the device for decreasing hydrogen concentration of a fuel cell system according to an exemplary embodiment of the present invention, the valve unit may include a plurality of valve holes that is spaced at predetermined intervals around the first pipe member; a valve flap that is hinge-coupled to the first pipe member by a hinge pin to turn between the outer side of the first pipe member and the inner side of the second pipe member and opens and closes the valve holes and the second channel; and a valve spring that is coupled to the hinge pin and applies elasticity to the valve flap.

Further, in the device for decreasing hydrogen concentration of a fuel cell system according to an exemplary embodiment of the present invention, the valve flap may be integrated with the catalysts, which are formed in the shape of a block, on a first side that faces the first channel.

Further, in the device for decreasing hydrogen concentration of a fuel cell system according to an exemplary embodiment of the present invention, the valve flap may be turned from the outer side of the first pipe member to the inner side of the second pipe member against the elasticity of the valve spring by pressure of the exhaust gas, and may open the valve holes and close the second channel, under a high-flow rate condition of the exhaust gas.

Further, in the device for decreasing hydrogen concentration of a fuel cell system according to an exemplary embodiment of the present invention, the valve flap may be turned from the inner side of the second pipe member to the outer side of the first pipe member by the elasticity of the valve spring, and may close the valve holes and open the second channel, under a low-flow rate condition of the exhaust gas.

Further, in the device for decreasing hydrogen concentration of a fuel cell system according to an exemplary embodiment of the present invention, the catalysts may include white gold and palladium and produce heat and water by reacting with oxygen and hydrogen in the exhaust gas.

Further, in the device for decreasing hydrogen concentration of a fuel cell system according to an exemplary embodiment of the present invention, the catalyst may have a plurality of meshes for passing the exhaust gas, may be arranged around the inner side of the center portion of the first pipe member, and may be attached with a predetermined thickness to the first side of the valve flap.

Further, in the device for decreasing hydrogen concentration of a fuel cell system according to an exemplary embodiment of the present invention, the first pipe member may be connected to a front connection end of the predetermined section of the exhaust line, close to the rear end of the exhaust line.

Further, in the device for decreasing hydrogen concentration of a fuel cell system according to an exemplary embodiment of the present invention, the second pipe member may be connected to a rear connection end of the predetermined section of the exhaust line.

Further, in the device for decreasing hydrogen concentration of a fuel cell system according to an exemplary embodiment of the present invention, the first pipe member may have a gas entrance that is connected to the front connection end of the predetermined section of the exhaust line for the exhaust gas to flow inside, and a gas exit disposed inside the second pipe member to discharge the exhaust gas.

Further, in the device for decreasing hydrogen concentration of a fuel cell system according to an exemplary embodiment of the present invention, the second pipe member may have an air entrance disposed close to the gas entrance for external air to flow into the second channel, and an air exit connected to the rear connection end of the predetermined section of the exhaust line to guide external air to the gas exit.

Further, in the device for decreasing hydrogen concentration of a fuel cell system according to an exemplary embodiment of the present invention, the first pipe member may be connected to the rear end of the exhaust line.

Further, in the device for decreasing hydrogen concentration of a fuel cell system according to an exemplary embodiment of the present invention, the second pipe member may be integrally connected to the first pipe member through a connection member.

Further, in the device for decreasing hydrogen concentration of a fuel cell system according to an exemplary embodiment of the present invention, the first pipe member may have a gas entrance connected to the rear end of the exhaust line for the exhaust gas to flow inside, and a gas exit disposed inside the second pipe member to discharge the exhaust gas.

Further, in the device for decreasing hydrogen concentration of a fuel cell system according to an exemplary embodiment of the present invention, the second pipe member may have an air entrance disposed close to the gas entrance for external air to flow into the second channel, and an air exit open to the atmosphere to guide external air to the gas exit.

According to another embodiment of the present invention, a device for decreasing hydrogen concentration of a fuel cell system, which is installed in an exhaust system of a fuel cell system so as to discharge exhaust gas including hydrogen and air from fuel cells to the atmosphere through an exhaust line, includes: a first pipe member connected to the exhaust line so as to provide a first channel for an exhaust gas to flow; a second pipe member disposed outside the first pipe member for external air to flow between the first pipe member and the second pipe member, the second pipe member guiding the exhaust gas to a gas exit side of the first pipe member; and a valve unit integrated with catalysts disposed in the first channel, disposed on the first pipe member, and opening/closing the second channel in accordance with flow pressure of the exhaust gas.

Further, in the device for decreasing hydrogen concentration of a fuel cell system according to an exemplary embodiment of the present invention, the first pipe member and the valve unit may constitute a catalyst diluter that dilutes hydrogen in the exhaust gas using a reaction between the exhaust gas and the catalysts.

Further, in the device for decreasing hydrogen concentration of a fuel cell system, the second pipe member may form an air diluter that dilutes hydrogen in the exhaust gas with external air.

According to exemplary embodiments of the present invention, under the low-flow rate/low-pressure condition of an exhaust gas when a vehicle starts and stops, or idles, the hydrogen concentration in the exhaust gas can be primarily reduced through the catalyst diluter and secondarily reduced through the air diluter.

Accordingly, in an exemplary embodiment of the present invention, by effectively reducing the concentration of hydrogen discharged to the atmosphere through the exhaust system of the fuel cell system, it is possible to satisfy the laws and regulations governing hydrogen discharge from fuel cell vehicles and to ensure competitive priority in relation to reduction of hydrogen discharged from fuel cell vehicles.

Further, in an exemplary embodiment of the present invention, it is possible to prevent an increase in differential pressure in an air supply system due to excessive inflow of external air, and it is also possible to reduce the amount of catalysts that are unnecessarily used, under the high-flow rate/high-pressure condition of an exhaust gas while a vehicle runs.

BRIEF DESCRIPTION OF THE DRAWINGS

The drawings are provided for reference in describing exemplary embodiments of the present invention and the spirit of the present invention should not be construed only by the accompanying drawings.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present invention will be described more fully hereinafter with reference to the accompanying drawings, in which exemplary embodiments of the invention are illustrated. As those skilled in the art would realize, the described embodiments may be modified in various different ways, all without departing from the spirit or scope of the present invention.

Further, the sizes and thicknesses of the configurations illustrated in the drawings are provided selectively for the convenience of description, so that the present invention is not limited to those illustrated in the drawings and the thicknesses are exaggerated to make some parts and regions clear.

Figure 1:
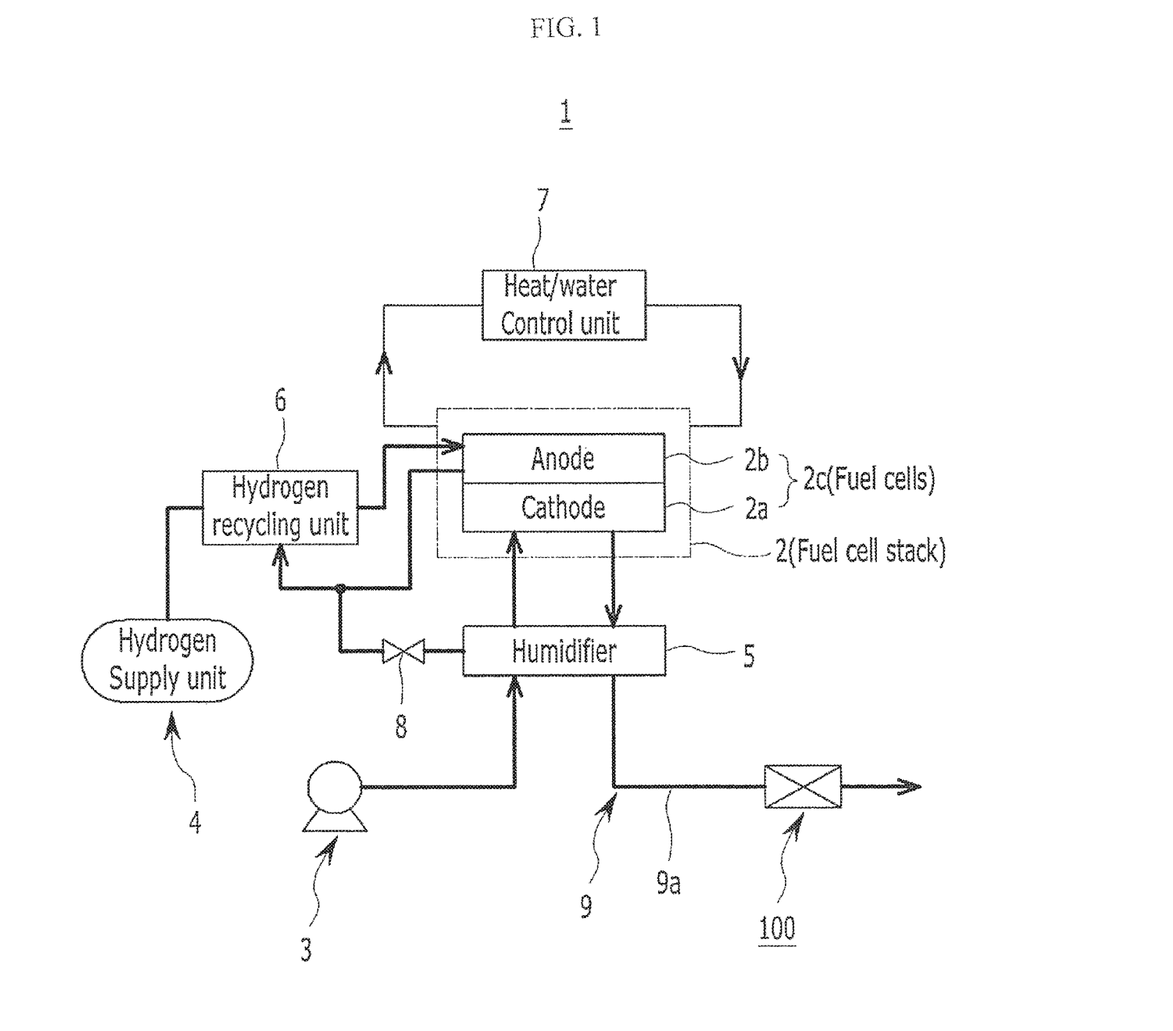
FIG. 1 is a block diagram schematically illustrating an example of a fuel cell system to which embodiments of the present invention are applied.

FIG. 1 is a block diagram schematically illustrating an example of a fuel cell system to which embodiments of the present invention are applied.

Referring to FIG. 1, a fuel cell system 1 to which an exemplary embodiment of the present invention is applied, which is an electric generator system that generates electrical energy using an electrochemical reaction of fuel and an oxidizer, may be mounted, for example, on a fuel cell vehicle that operates an electric motor using electrical energy.

In an exemplary embodiment of the present invention, fuel that is used for the fuel cell system 1 may be defined as a hydrogen gas (hereafter, referred to as "hydrogen" for convenience) and an oxidizer that is used for the fuel cell system 1 may be defined as air.

The fuel cell system 1 includes a fuel cell stack 2, an air supply unit 3, a hydrogen supply unit 4, a humidifier 5, a hydrogen recycling unit 6, and a heat/water control unit 7.

The fuel cell stack 2 is an assembly of fuel cells 2c, which each have a membrane (not illustrated), a cathode 2a, and an anode 2b, for generating electricity. The fuel cells 2c are supplied with hydrogen through the anodes 2b and air through the cathodes 2a, whereby they can generate electrical energy using an electrochemical reaction of hydrogen and oxygen.

The air supply unit 3 is operated by power and supplies atmospheric air to the cathodes 2a of the fuel cells 2c. The air supply unit 3 may include an air compressor and an air blower. The hydrogen supply unit 4 may include a hydrogen tank for compressing and keeping hydrogen and supplying the compressed hydrogen to the anodes 2b of the fuel cells 2c.

The humidifier 5 may include a membrane-humidifying unit that humidifies the air supplied from the air supply unit 3, using the air including water and discharged from the cathodes 2a of the fuel cells 2c, and supplies the humidified air to the cathodes 2a.

The hydrogen recycling unit 6 is provided to circulate the hydrogen, which is discharged from the anodes 2b of the fuel cells 2c, back to the anodes 2b. The hydrogen recycling unit 6 can mix the hydrogen discharged from the anodes 2b with the hydrogen supplied from the hydrogen supply unit 4 through an ejector and then supply the hydrogen mixture to the anodes 2b.

The heat/water control unit 7 is provided for removing heat and water, which are by-products produced by an electrochemical reaction of the fuel cells 2c, and controlling the operation temperature of the fuel cell stack 2.

The above components of the fuel cell system are well known in the art, so they are not described in detail herein.

On the other hand, if the fuel cell system 1 is mounted in a fuel cell vehicle, when the vehicle is started, the fuel cell system 1 discharges hydrogen due to crossing-over together with air through the cathodes 2a of the fuel cells 2c, and discharges purge hydrogen through the anodes 2b of the fuel cells 2c.

Further, while the vehicle runs, the fuel cell system 1 discharges only the purge hydrogen through the anodes 2b of the fuel cells 2c, and when the vehicle is stopped or idles (for example, under an ISG condition), the fuel cell system 1 discharges hydrogen due to crossing-over together with air through the cathodes 2a of the fuel cells 2c.

The crossing-over hydrogen may be defined as the hydrogen that crosses over to the cathodes 2a through the membrane due to residual pressure of the hydrogen remaining at the anodes 2b of the fuel cells 2c when the fuel cell system 1 is stopped.

Further, the purge hydrogen may be defined as the hydrogen discharged with impurities from the anodes 2b by a purge valve 8 to remove the impurities such as hydrogen and vapor accumulated on the anodes 2b of the fuel cells 2c during operation of the fuel cell system 1.

The hydrogen discharged from the fuel cells 2c or hydrogen including air is, for example, supplied to the humidifier 5 and then discharged with air from the humidifier 5, and in this process, the hydrogen is diluted with air and discharged with the concentration slightly reduced.

That is, when a vehicle starts, runs, stops, or idles, the hydrogen discharged from the fuel cells 2c flows into the humidifier 5 together with the air discharged from the fuel cells 2c, so the hydrogen can be discharged with the concentration slightly reduced by the air.

Accordingly, the fuel cell system 1 includes an exhaust system 9 for discharging the gas, which is discharged through the humidifier 5 (gas including hydrogen and air and referred to as "exhaust gas" hereafter), to the atmosphere. Herein, the exhaust gas includes water and vapor other than hydrogen and air.

The exhaust system 9 includes an exhaust line 9a fixed to the lower structure of a vehicle in the longitudinal direction of the vehicle. The exhaust line 9a is provided for discharging the exhaust gas to the atmosphere by sending it rearward through the vehicle.

Further, the exhaust line 9a is an exhaust pipe through which the exhaust gas flows, and various parts, such as a muffler reducing exhaust noise and a sensor sensing the concentration of hydrogen, may be disposed in the exhaust line 9a.

Meanwhile, an exhaust gas is discharged at a low flow rate through the exhaust line 9a when the vehicle starts and stops, or idles, and this state is referred to as a low-flow rate and low-pressure condition of an exhaust gas hereafter. The exhaust gas includes hydrogen having relatively high concentration under the low-flow rate and low-pressure condition.

Further, while the vehicle runs, an exhaust gas is discharged at a high flow rate through the exhaust line 9a and this state is referred to as a high-flow rate and high-pressure condition of an exhaust gas hereinafter. The exhaust gas includes hydrogen having relatively low concentration under the high-flow rate and high-pressure condition.

Herein, the low-flow rate/low-pressure condition and the high-flow rate/high-pressure condition of an exhaust gas may depend on the power that is consumed by the air compressor or the air blower of the air supply unit 3.

In an exemplary embodiment of the present invention, the low-flow rate/low-pressure condition and the high-flow rate/high-pressure condition are clearly discriminated in accordance with the states of a vehicle (e.g., starting, running, stopping, and idling), so the low-flow rate/low-pressure condition and the high-flow rate/high-pressure condition are not limited to specific ranges.

A device 100 for decreasing hydrogen concentration of a fuel cell system according to an exemplary embodiment of the present invention may be installed in the exhaust line 9a of the exhaust system 9. The device 100 has a structure that can effectively reduce the hydrogen concentration in an exhaust gas discharged to the atmosphere through the exhaust system 9 and can satisfy various governmental regulations and relevant laws for regulating hydrogen discharged from fuel cell vehicles.

That is, an exemplary embodiment of the present invention provides the device 100 that can dilute hydrogen in an exhaust gas using a catalyst and dilute hydrogen in an exhaust gas using external air under the low-flow rate/low-pressure condition, in which an exhaust gas is discharged at a low flow rate through the exhaust line 9a, when a vehicle starts and stops, or idles.

Further, the device 100 can reduce the amount of a catalyst that is unnecessarily used and prevent an increase in differential pressure in the air supply system due to flow of an exhaust gas in the high-flow rate/high-pressure condition, in which an exhaust gas is discharged at a high flow rate through the exhaust line 9a, when a vehicle runs.

Figure 2:
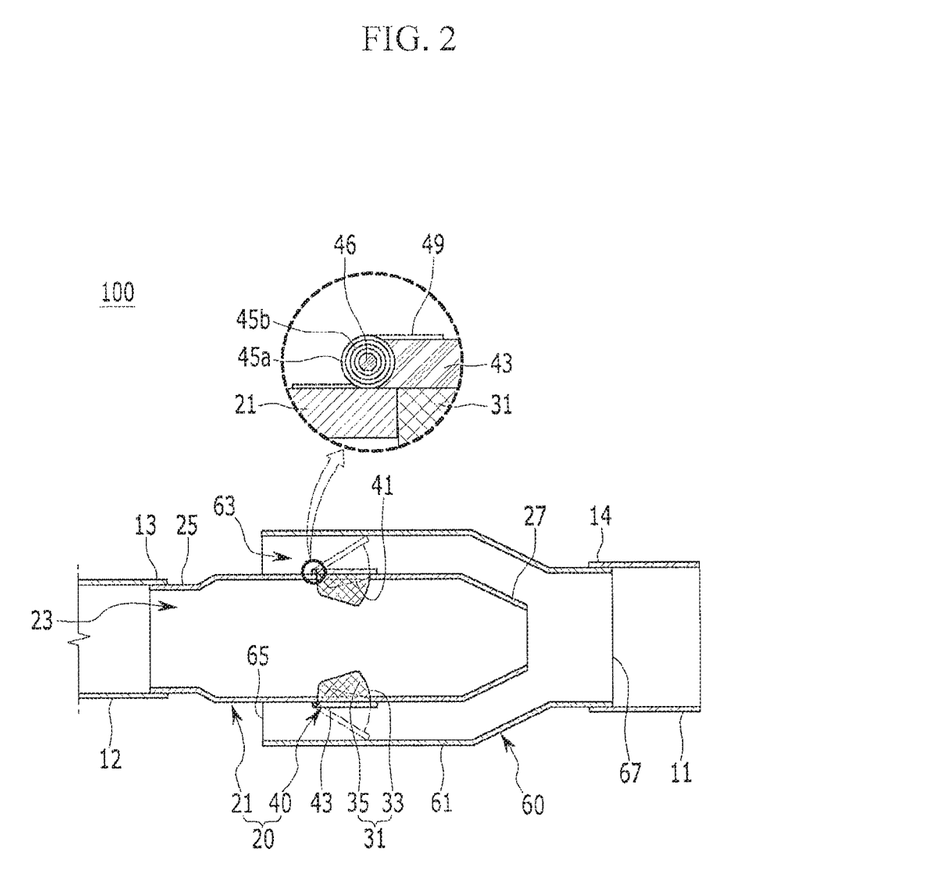
FIG. 2 is a first cross-sectional view illustrating a device for decreasing hydrogen concentration of the fuel cell system according to an exemplary embodiment of the present invention.
Figure 3:
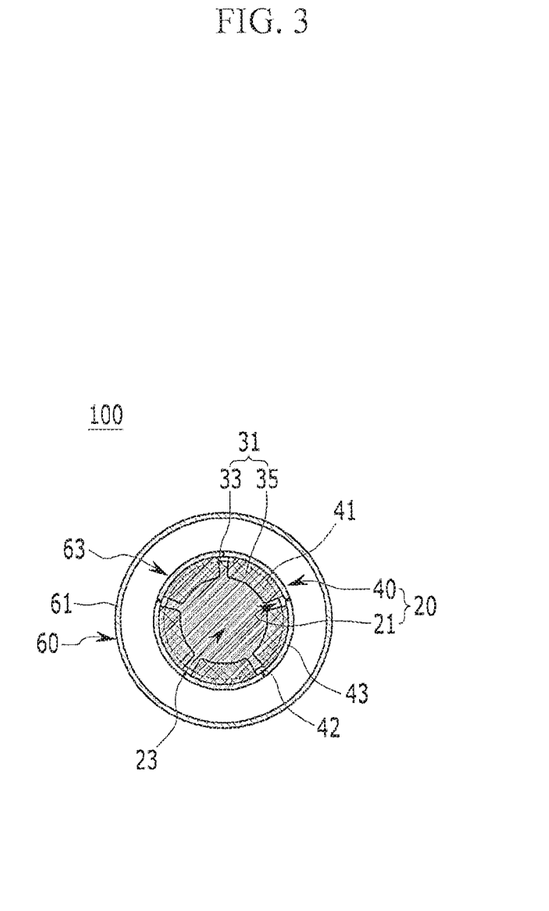
FIG. 3 is a second cross-sectional view illustrating the device for decreasing hydrogen concentration of the fuel cell system according to an exemplary embodiment of the present invention.

FIG. 2 is a first cross-sectional view illustrating a device for decreasing hydrogen concentration of a fuel cell system according to an exemplary embodiment of the present invention, and FIG. 3 is a second cross-sectional view illustrating the device for decreasing hydrogen concentration of the fuel cell system according to an exemplary embodiment of the present invention.

Referring to FIGS. 1 to 3, the device 100 includes a catalyst diluter 20 and an air diluter 60. The device 100 including the catalyst diluter 20 and the air diluter 60 may be installed at a predetermined section close to the rear end of the exhaust line 9a.

The reason of installing the device 100 close to the rear end of the exhaust line 9a is for preventing condensate water from freezing at a predetermined section of the exhaust line 9a in winter by easily discharging condensate water in an exhaust gas flowing through the exhaust line 9a.

Further, another reason of installing the device 100 close to the rear end of the exhaust line 9a is for maximizing the ability to dilute hydrogen in the exhaust gas discharged through the exhaust line 9a with external air.

Herein, the predetermined section of the exhaust line 9a may be defined as the section between a first section 11 close to the rear end of the entire exhaust line 9a and a second section 12 except the first section 11. The first section 11 and the second section 12 are fixed to a lower structure of a vehicle.

The device 100 is disposed between the first section 11 and the second section 12 of the exhaust line 9a and mutually connects the first section 11 and the second section 12.

In the following description, the connection end of the second section 12 connected to the device 100 in the predetermined section of the exhaust line 9a is referred to as a front connection end 13. Further, the connection end of the first section 11 connected to the device 100 in the predetermined section of the exhaust line 9a is referred to as a rear connection end 14.

Further, the term "end" may be defined as an end or a portion (e.g., end portion) including the end, but it is defined as the latter in an exemplary embodiment of the present invention.

In an exemplary embodiment of the present invention, the catalyst diluter 20 is provided for diluting the hydrogen in an exhaust gas discharged through the exhaust line 9a of the exhaust system 9, using a catalytic reaction. That is, the catalyst diluter 20 is provided for diluting the hydrogen in an exhaust gas using a catalytic reaction under the low-flow rate/low-pressure condition, in which the exhaust gas is discharged at a low flow rate through the exhaust line 9a, when a vehicle starts and stops, or idles.

The catalyst diluter 20 is coupled to the front connection end of the exhaust line 9a at the rear end portion of the exhaust line 9a, that is, the front connection end 13 of the second section 12 described above. The catalyst diluter 20 includes a first pipe member 21 having catalysts 31.

The first pipe member 21 is a pipe for generating a stream of an exhaust gas, and in more detail, it is a cylindrical pipe with both ends open. The first pipe member 21 is connected to the front connection end 13 of the second section 12.

The first pipe member 21 provides a first channel 23 for an exhaust gas to flow. The first pipe member 21 has a gas entrance 25 for the exhaust gas discharged through the second section 12 to flow into the first channel 23. The gas entrance 25, which is the front end of both open ends of the first pipe member 21, is connected to the front connection end 13 of the second section 12.

Further, the first pipe member 21 has a gas exit 27 for discharging an exhaust gas. The gas exit 27, which is the rear end of both open ends of the first pipe member 21, is connected to the air diluter 60 to be described below.

The gas exit 27 of the first pipe member 21 is tapered such that the diameter gradually decreases in the discharge direction of an exhaust gas. That is, the first pipe member 21 may have a shape of which the diameter is uniform in a predetermined section from the gas entrance 25 and then gradually decreased in the discharge direction of an exhaust gas from the end of the section.

The catalysts 31 are provided to dilute the hydrogen in the exhaust gas flowing through the first channel 23 of the first pipe member 21 by reacting with the hydrogen. The catalysts 31 are disposed in the first channel 23 of the first pipe member 21.

In an exemplary embodiment of the present invention, the catalysts 31 can dilute the hydrogen in the exhaust gas flowing through the first channel 23 of the first pipe member 21 by reacting with the hydrogen under the low-flow rate/low-pressure condition, in which the exhaust gas is discharged at a low flow rate through the exhaust line 9a, when a vehicle starts and stops, or idles. The catalysts 31 will be described in detail below together with a valve unit 40.

In an exemplary embodiment of the present invention, the air diluter 60 is provided for diluting the hydrogen in the exhaust gas discharged from the first pipe member 21 with external air by guiding the external air to the gas-discharging portion of the catalyst diluter 20, that is, to the gas exit 27 of the first pipe member 21. That is, the air diluter 60 is provided for diluting the hydrogen in the exhaust gas, which discharged to the gas exit 27 of the first pipe member 21 after passing by the catalysts 31, with external air under the low-flow rate/low-pressure condition, in which the exhaust gas is discharged at a low flow rate through the exhaust line 9a, when a vehicle starts and stops, or idles Further, the air diluter 60 has another function that reduces the temperature of the exhaust gas discharged from the first pipe member 21 and the temperature of the first pipe member 21, which are instantaneously increased by an exothermic reaction between the exhaust gas and the catalysts 31 in the catalyst diluter 20, using external air.

The air diluter 60 is connected to the rear connection end of the predetermined section of the exhaust line 9a, that is, to the rear connection end 14 of the first section 11 described above, with the catalyst diluter 20 therein. The air diluter 60 includes a second pipe section 61 provided outside the catalyst diluter 20.

The second pipe member 61 is a pipe for generating a stream of an external air between the first and second pipe members 21 and 61, in detail, is a cylindrical pipe with both ends open. The second pipe member 61 is connected to the rear connection end 14 of the first section 11 with the first pipe member 21 at the center portion therein.

The second pipe member 61 provides a second channel 63 for external air to flow between the first and second pipe members 21 and 61. The first and second pipe members 21 and 61 preferably form a coaxial dual pipe, in which the second channel 63 may be formed between an outer side of the first pipe member 21 and an inner side of the second pipe member 61.

Herein, the second channel 63 is connected to the gas exit 27 of the first pipe member 21 between the outer side of the first pipe member 21 and the inner side of the second pipe member 61, thereby generating a stream of external air that reaches the rear connection end 14 of the first section 11.

The second pipe member 61 provides an air entrance 65 for external air to flow into the second channel 63. The air entrance 65, which is the front end of both open ends of the second pipe member 61, is positioned close to the gas entrance 25 of the first pipe member 21 and open to the atmosphere.

Further, the second pipe member 61 provides an air exit 67 for external air, which is guided to the gas exit 27 of the first pipe member 21 through the second channel 63, to flow into the first section 11 described above. The air exit 67, which is the rear end of both open ends of the second pipe member 61, is connected to the rear connection end 14 of the first section 11.

Herein, the air exit 67 of the second pipe member 61 may have a shape of which the diameter is gradually decreased in the discharge direction of the exhaust gas to correspond to the gas exit 27 of the first pipe member 21. That is, the second pipe member 61 may have a shape of which the diameter is uniform in a predetermined section in the flow direction of external air from the air entrance 65 and then gradually decreased in the flow direction of external air from the end of the section.

The stream of external air flowing through the second channel 63 may be generated by a pressure difference between the air entrance 65 of the second pipe member 61 and the gas exit 27 of the first pipe member 21.

That is, the pressure of the exhaust gas discharged from the gas exit 27 after passing by the catalysts 31 in the first pipe member 21 is larger than the atmospheric pressure around the air entrance 65, so external air flows into the air entrance 65 in accordance with Bernoulli's theorem, so it can generate a stream reaching to the gas exit 27 through the second channel 63.

Further, the amount of external air flowing inside through the air entrance 65 of the second pipe member 61 can be controlled by changing the diameter of the gas exit 27 and the pressure at the gas exit 27.

On the other hand, the catalyst diluter 20 according to an exemplary embodiment of the present invention includes valve unit 40 integrated with catalysts 31.

The valve unit 40 is provided to selectively open and close the second channel 63 of the air diluter 60, depending on the flow pressure of the exhaust gas discharged through the first channel 23 of the first pipe member 21.

Herein, the valve unit 40 opens the second channel 63 of the air diluter 60 under the low-flow rate/low-pressure condition in which an exhaust gas is discharged at a low flow rate through the exhaust line 9a, when a vehicle starts and stops, or idles.

The value unit 40 closes the second channel 63 of the air diluter 60 under the high-flow rate/high-pressure condition in which an exhaust gas is discharged at a high flow rate through the exhaust line 9a when a vehicle runs.

Further, the valve unit 40 can open the second channel 63 of the air diluter 60 without being operated by the flow pressure of the exhaust gas under the low-flow rate/low-pressure condition of the exhaust gas. Accordingly, since the exhaust gas includes relatively high-concentration hydrogen under this condition, the catalyst diluter 20 can dilute the hydrogen in the exhaust gas using a catalytic reaction by the catalysts 31 and the air diluter 60 can dilute the hydrogen in the exhaust gas discharged from the catalyst diluter 20 with the external air flowing through the second channel 63.

Further, the valve unit 40 is operated by the flow pressure of the exhaust gas and can close the second channel 63 of the air diluter 60 under the high-flow rate/high-pressure condition of the exhaust gas. Accordingly, since the exhaust gas includes relatively high-concentration hydrogen under this condition, the catalyst diluter 20 can discharge the exhaust gas with minimum catalytic reaction between the catalysts 31 and the exhaust gas. In this case, as the valve unit 40 closes the second channel 63 of the air diluter 60, it is possible to prevent the external air from flowing inside through the second channel 63.

In an exemplary embodiment of the present invention, the valve unit 40 described above includes valve holes 41, a valve flap 43, and a valve spring 49.

The valve holes 41 are spaced at a predetermined distance around the first pipe member 21 at a predetermined section of the first pipe member 21 of the catalyst diluter 20. For example, the valve holes 41 are rectangular holes that communicate with the first channel 23 of the first pipe member 21. Further, ribs 42 having a predetermined width are formed between the holes around the first pipe member 21 to separate the valve holes 41.

The valve flap 43, which is a valve body that selectively opens/closes the valve holes 41 and the second channel 63, is hinged to the first pipe member 21. The valve flap 43 has a shape corresponding to the outer shape of the first pipe member 21. The valve flap 43 is supported by the ribs 42 at both sides of each of the valve holes 41 and closes the valve holes 41.

Herein, the valve flap 43 turns in the second channel 63, that is, between the outer side of the first pipe member 21 and the inner side of the second pipe member 61 to open/close the valve holes 41 and the second channel 63, so it is hinged to the first pipe member 21 by a hinge pin 46 for this purpose.

For example, the first pipe member 21 has a first hinge connection portion 45a at a side of each of the valve hole 41 and the valve flap 43 has a second hinge connection portion 45b pivotably connected to the first hinge connection portion 45a. A hinge pin 46 is fixed to the second hinge connection portion 45b of the valve flap 43 and rotatably fitted in the first hinge connection portion 45a of the first pipe member 21.

The catalyst 31 described above is integrally fixed to a first side of the valve flap 43, which faces the valve holes 41, that is, a first side facing the first channel 23. A second side of the valve flap 43 is positioned in the second channel 63 between the outer side of the first pipe member 21 and the inner side of the second pipe member 61.

For example, in an exemplary embodiment of the present invention, the catalysts 31 are provided in the shape of a block. The catalysts 31 are arranged around the inner side at the center portion of the first pipe member 21 and fixed with a predetermined thickness to the first side of the valve flap 43. Since the catalysts 31 are integrally fixed to the first side of the valve flap 43, they can turn with the valve flap 43.

The catalysts 31 produce heat and water by reacting with hydrogen and oxygen in the exhaust gas flowing through the first channel 23 of the first pipe member 21, thereby reducing the concentration of the hydrogen.

The catalysts 31 decomposes hydrogen in the exhaust gas into hydrogen ions and electrons and generates an exothermic reaction that produces heat and water by making the hydrogen ion and electrons react with the oxygen in the atmosphere.

The catalysts 31 are formed by putting a catalytic substance (not illustrated) into a container 33 and the container 33 have meshes 35 for passing the exhaust gas. The meshes 35 are arranged along the first channel 23 and may be formed in a rectangular shape, a hexagonal shape, or a triangular shape. Further, the catalytic substance may include white gold or palladium.

As described above, by changing the meshes 35 in various shapes, it is possible to reduce the amount of a catalytic substance to be used and maximize the efficient in a catalytic reaction for diluting hydrogen in an exemplary embodiment of the present invention.

The catalysts 31 generate an exothermic reaction by absorbing hydrogen and produce heat and water, such as a metal hydride well known in the art, so the composition and structure are not described in detail herein.

The catalysts 31 has a function as a silencer that reduces exhaust noise by the exhaust gas flowing through the exhaust line 9a, in addition to the function of diluting the hydrogen in the exhaust gas flowing through the first channel 23 of the first pipe member 21 by generating a catalytic reaction.

The valve spring 49 is provided to provide elasticity applied to the outer side of the first pipe member 21 to the valve flap 43. The valve spring 49 is coupled to the hinge pin 46 and elastically supports the first pipe member 21 and the valve flap 43. For example, the valve spring 49 may be a torsion spring.

The valve flap 43 is turned to the inner side of the second pipe member 61 from the outer side of the first pipe member 21 against the elasticity of the valve spring 49 by the flow pressure of the exhaust gas under the high-flow rate/high-pressure condition in which an exhaust gas is discharged at a high flow rate through the exhaust line 9a when a vehicle runs.

The valve flap 43 closes the second channel 63 between the outer side of the first pipe member 21 and the inner side of the second pipe member 61 while opening the valve holes 41, in which most of each of the catalysts 31 comes out of the first channel 23 of the first pipe member 21 and turns inside the second channel 63.

Opening of the valve holes 41 under the high-flow rate/high-pressure condition of an exhaust gas means opening by the valve flap 43 turning, but actually the valve holes 41 is closed by the catalysts 31 integrated with the valve flap 43.

Further, the valve flap 43 is turned to the outer side of the first pipe member 21 from the inner side of the second pipe member 61 by the elasticity of the valve spring 49 under the low-flow rate/low-pressure condition in which an exhaust gas is discharged at a low flow rate through the exhaust line 9a, when a vehicle starts and stops, or idles.

In this case, the valve flap 43 opens the second channel 63 and closes the valve holes 41 and most of each of the catalysts 31 is positioned in the first channel 23 of the first pipe member 21.

The operation of the device 100 which has the configuration described above is described hereafter in detail with reference to drawings including the drawings stated above.

Figure 4:
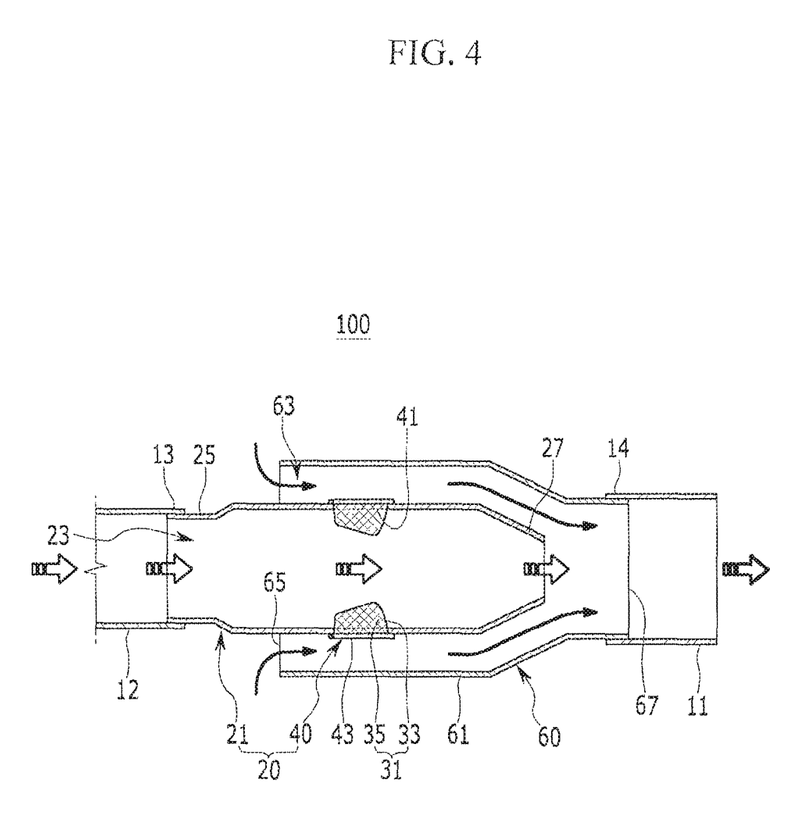
FIGS. 4 and 5 are views illustrating the operation of the device for decreasing hydrogen concentration of the fuel cell system according to an exemplary embodiment of the present invention.
Figure 5:
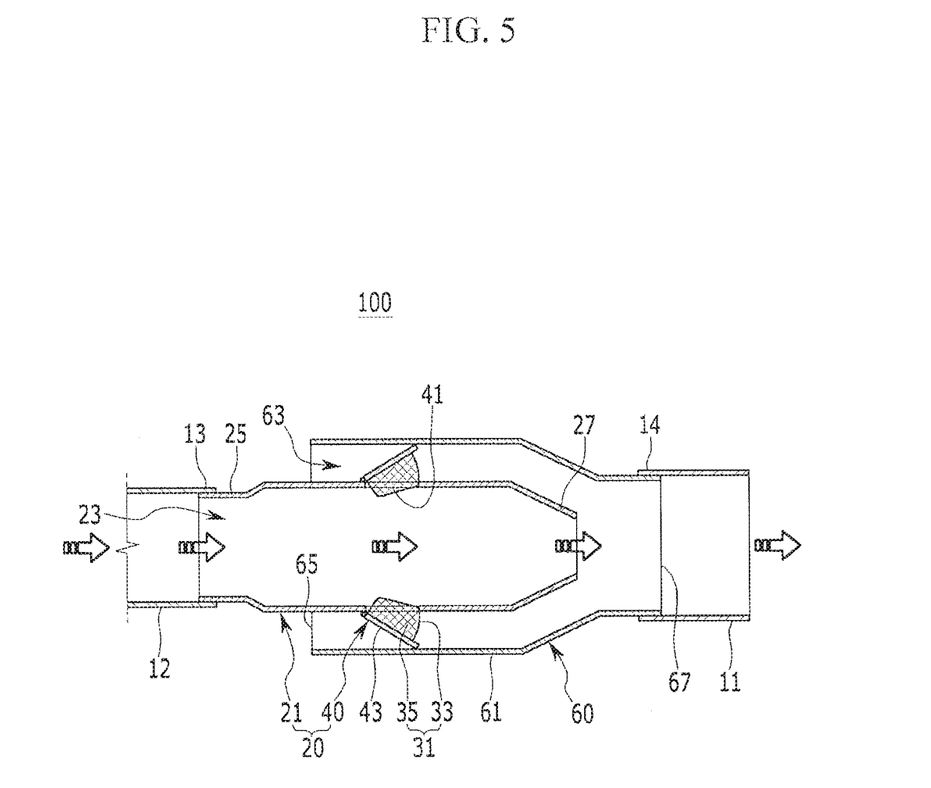

FIGS. 4 and 5 are views illustrating the operation of a device for decreasing hydrogen concentration of a fuel cell system according to an exemplary embodiment of the present invention.

First, referring to FIG. 1 as described above, in an exemplary embodiment of the present invention, when a vehicle is started, a fuel cell system 1 discharges hydrogen due to crossing-over with air through the cathodes 2a of the fuel cells 2c and discharges purge hydrogen through the anodes 2b of the fuel cells 2c.

Further, while the vehicle runs, the fuel cell system 1 discharges the purge hydrogen through the anodes 2b of the fuel cells 2c, and when the vehicle is stopped or idles (for example, under an ISG condition), the fuel cell system 1 discharges hydrogen due to crossing-over together with air through the cathodes 2a of the fuel cells 2c.

The hydrogen discharged from the fuel cells 2c is supplied to the humidifier 5 and then discharged with air from the humidifier 5, and in this process, the hydrogen can be diluted with air and discharged with the concentration slightly reduced.

On the other hand, referring to FIG. 4, in an exemplary embodiment of the present invention, the low-flow rate/low-pressure condition in which an exhaust gas is discharged at a low flow rate, when a vehicle starts and stops, or idles is satisfied, and under this condition, the exhaust gas includes relatively high-concentration hydrogen.

In the low-flow rate/low-pressure condition of the exhaust gas, since the valve flap 43 of the valve unit 40 has been turned to the outer side of the first pipe member 21 from the inner side of the second pipe member 61 by the elasticity of the valve spring 49, it closes the valve holes 41 while supporting the ribs 42 of the first pipe member 21.

Further, the valve flap 43 has opened the second channel 63 between the outer side of the first pipe member 21 and the inner side of the second side member 61, and most of the catalysts 31 are positioned around the inner side of the center portion of the first channel 23 of the first pipe member 21.

Under this condition, the exhaust gas (gas including hydrogen and air) discharged from the humidifier 5 flows through the exhaust line 9a of the exhaust system 9 and is discharged to the atmosphere, and in this process, the exhaust gas flows into the gas entrance 25 of the first pipe member 21 of the catalyst diluter 20.

The exhaust gas flowing into the gas entrance 25, as described above, flows through the first channel 23 of the first pipe member 21, in which some of the exhaust gas passes through the meshes 35 of the catalysts 31.

In this process, the catalysts 31 decompose the hydrogen in the exhaust gas into hydrogen ions and electrons, and water and heat are produced by an exothermic reaction of the hydrogen ion, the electrons, and the oxygen in the air.

Accordingly, in an exemplary embodiment of the present invention, the hydrogen in the exhaust gas and oxygen are converted into water, and the hydrogen is diluted by a catalytic reaction of the catalysts 31, so it is possible to primarily reduce the concentration of the hydrogen in the exhaust gas.

Further, in an exemplary embodiment of the present invention, the pressure of the exhaust gas discharged through the exhaust line 9a is distributed by the catalysts 31, whereby it is possible to reduce exhaust noise of the exhaust gas.

Further, in an exemplary embodiment of the present invention, since the catalysts 31 are arranged around the inner side of the center portion of the first channel 23 of the first pipe member 21 by the valve flap 43, it is possible to prevent an increase in differential pressure in the air supply system due to the exhaust gas flowing through the first channel 23.

As described above, some of the exhaust gas that has been primarily decreased in hydrogen concentration through the catalyst diluter 20 is discharged with the remaining exhaust gas through the gas exit 27 of the first pipe member 21.

In this process, in an exemplary embodiment of the present invention, since the pressure of the exhaust gas discharged through the gas exit 27 is larger than the atmospheric pressure around the air entrance 65 of the second pipe member 61, external air flows into the air entrance 65 due to the pressure difference between the air entrance 65 and the gas exit 27.

The external air flowing into the air entrance 65 makes a stream reaching to the gas exit 27 through the second channel 63 between the first and second pipe members 21 and 61.

Accordingly, in an exemplary embodiment of the present invention, external air is guided to the gas exit 27 through the second channel 63, and the hydrogen in the exhaust gas is diluted by the external air by mixing the external air with the exhaust gas discharged through the gas exit 27, whereby it is possible to secondarily reduce the concentration of the hydrogen.

Further, in an exemplary embodiment of the present invention, as external air is guided to the gas exit 27 through the second channel 63, it is possible to reduce the temperature of the exhaust gas discharged through the first pipe member 21 and the temperature of the first pipe member 21 that are instantaneously increased by the exothermic reaction of the catalyst 31.

As described above, the hydrogen concentration in the exhaust gas is secondarily reduced by mixing the exhaust gas and external air at the gas exit 27 of the first pipe member 21, and then the exhaust gas of which the hydrogen concentration have been secondarily reduced is discharged to the atmosphere through the first section 11 of the exhaust line 9a in an exemplary embodiment of the present invention.

Accordingly, in an exemplary embodiment of the present invention, under the low-flow rate/low-pressure condition of an exhaust gas, the hydrogen concentration in the exhaust gas can be primarily reduced by a catalytic reaction through the catalyst diluter 20 and secondarily reduced by external air through the air diluter 60.

On the other hand, referring to FIG. 5, in an exemplary embodiment of the present invention, the high-flow rate/high-pressure condition in which an exhaust gas is discharged at a high flow rate while a vehicle runs is satisfied, and under this condition, the exhaust gas includes relatively low-concentration hydrogen.

Under the high-flow rate/high-pressure condition, the exhaust gas (gas including hydrogen and air) discharged from the humidifier 5 flows through the exhaust line 9a of the exhaust system 9 and is discharged to the atmosphere, and in this process, the exhaust gas flows into the gas entrance 25 of the first pipe member 21 of the catalyst diluter 20.

Then, the valve flap 43 of the valve unit 40 is turned to the inner side of the second pipe member 61 from the outer side of the first pipe member 21 around the hinge pin 46 against the elasticity of the valve spring 49 by the flow pressure of the exhaust gas.

In this case, the valve flap 43 closes the second channel 63 between the outer side of the first pipe member 21 and the inner side of the second pipe member 61 while opening the valve holes 41, in which most of each of the catalysts 31 comes out of the first channel 23 of the first pipe member 21 and turns inside the second channel 63.

Since the exhaust gas includes relatively low-concentration hydrogen under the high-flow rate/high-pressure condition, it is not required to reduce the hydrogen concentration in the exhaust gas. Accordingly, the exhaust gas flows through the first channel 23 without reacting with the catalysts 31 in the second channel 63 and is then discharged through the gas exit 27 of the first pipe member 21.

In this process, an extremely small amount of the exhaust gas may react with the catalysts 31 through the valve holes 41, but most of the exhaust gas flows through the first channel 23 and is discharged through the gas exit 27. Further, the exhaust gas is discharged through the air exit 67 of the second pipe member 61 and discharged to the atmosphere through the first section 11 of the exhaust line 9a.

In an exemplary embodiment of the present invention, since the valve flap 43 has closed the second channel 63, the external air cannot flow through the second channel 63 in this process.

Accordingly, in an exemplary embodiment of the present invention, under the high-flow rate/high-pressure condition of an exhaust gas, since external air is prevented from flowing inside through the second channel 63 and the exhaust gas is discharged without reacting with the catalysts 31, it is possible to prevent an increase in differential pressure in the air supply system and reduce the amount of the catalysts 31 that are unnecessarily used.

According to the device 100, under the low-flow rate/low-pressure condition of an exhaust gas when a vehicle starts and stops, or idles, the hydrogen concentration in the exhaust gas can be primarily reduced through the catalyst diluter 20 and secondarily reduced through the air diluter 60.

Accordingly, in an exemplary embodiment of the present invention, by effectively reducing the concentration of hydrogen discharged to the atmosphere through the exhaust system 9 of the fuel cell system 1, it is possible to satisfy the regulations and laws governing hydrogen discharge from fuel cell vehicles and to ensure competitive priority in relation to reduction of hydrogen discharged from fuel cell vehicles.

Further, in an exemplary embodiment of the present invention, it is possible to prevent an increase in differential pressure in an air supply system due to excessive inflow of external air under the high-flow rate/high-pressure condition of an exhaust gas while a vehicle runs.

Therefore, it is possible to improve the efficiency of an air supply unit and the efficiency of the entire fuel cell system in an exemplary embodiment of the present invention and it is also possible to prevent noise due to excessive inflow of external air.

Figure 6:
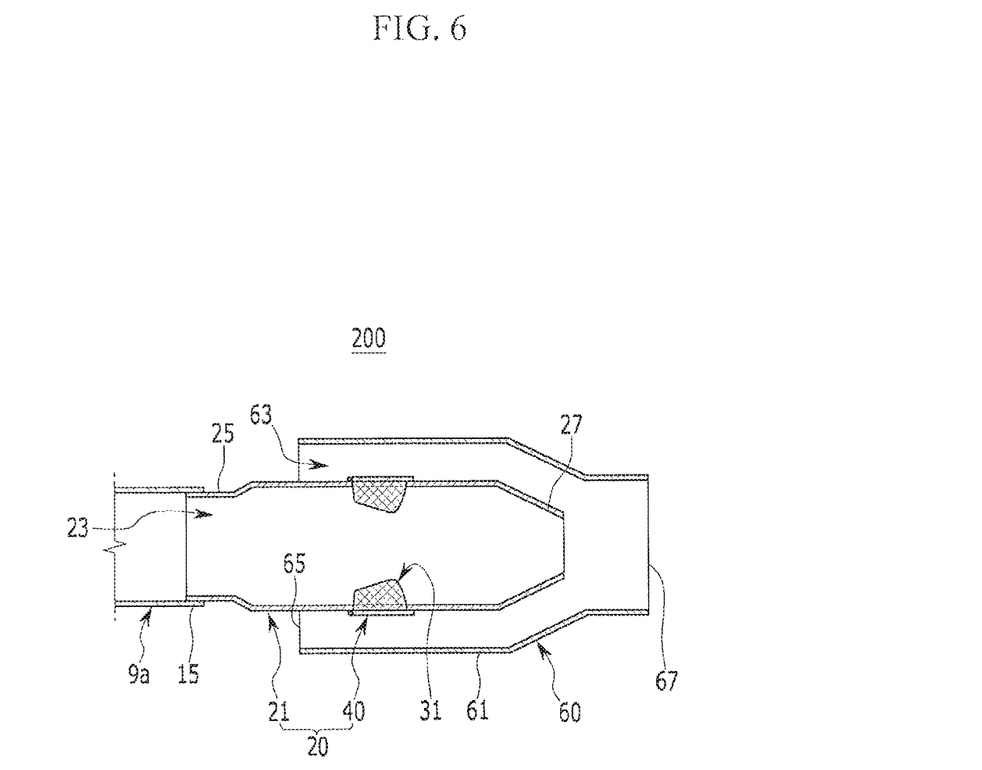
FIGS. 6 and 7 are cross-sectional views illustrating a device for decreasing hydrogen concentration of a fuel cell system according to another exemplary embodiment of the present invention.
Figure 7:
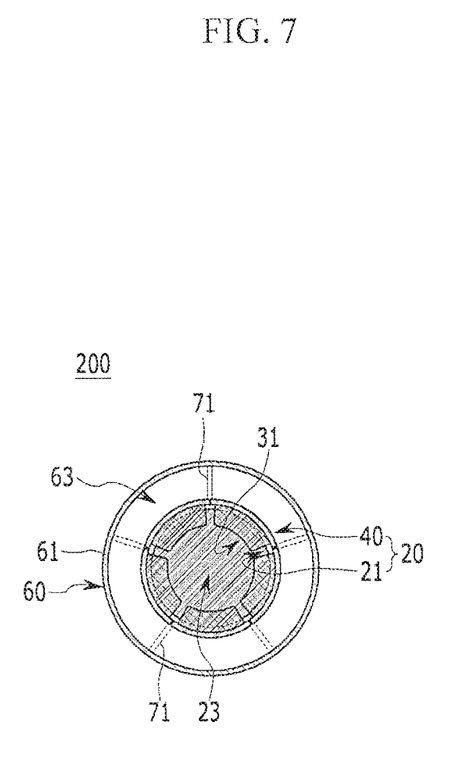

FIGS. 6 and 7 are cross-sectional views schematically illustrating a device for decreasing hydrogen concentration of a fuel cell system according to another exemplary embodiment of the present invention.

Referring to FIGS. 6 and 7, a device 200 for decreasing hydrogen concentration of a fuel cell system according to another exemplary embodiment of the present invention has a configuration similar to the previous exemplary embodiment and includes a catalyst diluter 20 and an air diluter 60 at the rear end 15 (the very end of the rear) of an exhaust line 9a.

In an exemplary embodiment, the catalyst diluter 20 is connected to the rear end 15 of the exhaust line 9a. The air diluter 60 is integrally connected with the catalyst diluter 20 with the catalyst diluter 20 therein.

The catalyst diluter 20, as in the previous exemplary embodiment, provides a first channel 23 defined by a first pipe member 21 for an exhaust gas to flow and includes a valve unit 40 having integrated with catalysts 31.

The catalyst diluter 20 has a gas entrance 25 and a gas exit 27 at both ends of the first pipe member 21. Herein, the gas entrance 25 is connected to the rear end 15 of the exhaust line 9a.

The air diluter 60, as in the previous exemplary embodiment, provides a second channel 63 for external air to flow with the first pipe member 21 at the center portion inside the second pipe member 61.

The air diluter 60 has an air entrance 65 and an air exit 67 at both ends of the second pipe member 61. The second channel 63 is formed between the outer side of the first pipe member 21 and the inner side of the second pipe member 61.

Herein, the air entrance 65 is open to the atmosphere around the gas entrance 25 of the first pipe member 21 and the air exit 67 is open to the atmosphere around the gas exit 27 of the first pipe member 21.

A stream of external air connecting the air entrance 65 of the second pipe member 21 to the atmosphere and connecting the air exit 67 of the second pipe member 61 to the atmosphere is formed in the second channel 63 between the outer side of the first pipe member 21 and the inner side of the second pipe member 61.

Further, the second pipe member 61 is integrally coupled to the first pipe member 21 with the first pipe member 21 at the center portion therein. The first and second pipe members 21 and 61 form a coaxial dual pipe, in which the second channel 63 may be formed between the outer side of the first pipe member 21 and the inner side of the second pipe member 61.

In this configuration, the first and second pipe members 21 and 61 are integrally coupled by connecting members 71 such as connecting pins and, for example, the connecting member 71 may integrally couple the outer side of the first pipe member 21 and the inner side of the second pipe member 61.

Therefore, it is possible to primarily reduce the hydrogen concentration in an exhaust gas through the catalyst diluter 20 and secondarily reduce the hydrogen concentration in the exhaust gas through the air diluter 60, as in the previous exemplary embodiment. Further, it is possible to discharge the exhaust gas of which the hydrogen concentration has been secondarily reduced to the atmosphere through the air exit 67 of the second pipe member 61.

As described above, the other configuration and operational effects of the device 200 for decreasing hydrogen concentration of a fuel cell system according to another exemplary embodiment of the present invention are the same as those in the previous exemplary embodiment, so the detailed description is not provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for decreasing hydrogen concentration of a fuel cell system, the device being installed in an exhaust system of the fuel cell system so as to discharge exhaust gas including hydrogen and air from fuel cells to the atmosphere through an exhaust line, the device comprising:
   a catalyst diluter that includes catalysts for diluting hydrogen in the exhaust gas by generating a catalytic reaction, the catalyst diluter being connected to the exhaust line; and
   an air diluter that is disposed outside the catalyst diluter and guides external air to a gas exit side of the catalyst diluter,
   wherein the catalyst diluter includes a valve unit that opens and closes an external air channel of the air diluter in accordance with flow pressure of the exhaust gas.

2. The device of claim 1, wherein:
   the valve unit is integrated with the catalysts.

3. The device of claim 1, wherein:
   the catalyst diluter includes a first pipe member providing a first channel for the exhaust gas to flow, and
   the air diluter includes a second pipe member providing a second channel for external air to flow between the first pipe member and the second pipe member, with the first pipe member at the center portion therein.

4. The device of claim 3, wherein:
   the first and second pipe members form a coaxial dual pipe, and
   the second channel is formed between an outer side of the first pipe member and an inner side of the second pipe member.

5. The device of claim 3, wherein:
   when the exhaust gas is discharged from a front side to a rear side through the exhaust line,
   the catalyst diluter and the air diluter are disposed in a predetermined section close to a rear end of the exhaust line.

6. The device of claim 3, wherein:
   when the exhaust gas is discharged from a front side to a rear side through the exhaust line,
   the catalyst diluter and the air diluter are integrally formed and disposed at a rear end of the exhaust line.

7. The device of claim 3, wherein the valve unit includes:
   a plurality of valve holes that is spaced apart from each other at predetermined intervals around the first pipe member,
   a valve flap that is hinge-coupled to the first pipe member by a hinge pin to turn between an outer side of the first pipe member and an inner side of the second pipe member and opens and closes the valve holes and the second channel, and
   a valve spring that is coupled to the hinge pin and applies elasticity to the valve flap.

8. The device of claim 7, wherein the valve flap is integrated with the catalysts, which are formed in the shape of a block, on a first side that faces the first channel.

9. The device of claim 8, wherein the valve flap is turned from the outer side of the first pipe member to the inner side of the second pipe member against the elasticity of the valve spring by pressure of the exhaust gas, and opens the valve holes and closes the second channel, under a high-flow rate condition of the exhaust gas.

10. The device of claim 9, wherein the valve flap is turned from the inner side of the second pipe member to the outer side of the first pipe member by the elasticity of the valve spring, and closes the valve holes and opens the second channel, under a low-flow rate condition of the exhaust gas.

11. The device of claim 8, wherein:
the catalysts include white gold and palladium, and produce heat and water by reacting with oxygen and hydrogen in the exhaust gas.

12. The device of claim 8, wherein the catalysts have a plurality of meshes for passing the exhaust gas, are arranged around the inner side of the center portion of the first pipe member, and are attached with a predetermined thickness to the first side of the valve flap.

13. The device of claim 5, wherein:
the first pipe member is connected to a front connection end of the predetermined section of the exhaust line, close to the rear end of the exhaust line, and
the second pipe member is connected to a rear connection end of the predetermined section of the exhaust line.

14. The device of claim 13, wherein the first pipe member has:
a gas entrance that is connected to the front connection end of the predetermined section of the exhaust line for the exhaust gas to flow inside, and
a gas exit disposed inside the second pipe member to discharge the exhaust gas.

15. The device of claim 14, wherein the second pipe member has:
an air entrance disposed close to the gas entrance for external air to flow into the second channel, and
an air exit connected to the rear connection end of the predetermined section of the exhaust line to guide external air to the gas exit.

16. The device of claim 6, wherein:
the first pipe member is connected to the rear end of the exhaust line, and
the second pipe member is integrally connected to the first pipe member through a connection member.

17. The device of claim 16, wherein the first pipe member has:
a gas entrance connected to the rear end of the exhaust line for the exhaust gas to flow inside, and
a gas exit disposed inside the second pipe member to discharge the exhaust gas.

18. The device of claim 17, wherein the second pipe member has:
an air entrance disposed close to the gas entrance for external air to flow into the second channel, and
an air exit open to the atmosphere to guide external air to the gas exit.

19. A device for decreasing hydrogen concentration of a fuel cell system that is installed in an exhaust system of a fuel cell system so as to discharge exhaust gas including hydrogen and air from fuel cells to the atmosphere through an exhaust line, the device comprising:
a first pipe member connected to the exhaust line so as to provide a first channel for an exhaust gas to flow;
a second pipe member disposed outside the first pipe member for external air to flow between the first pipe member and the second pipe member, the second pipe member guiding the exhaust gas to a gas exit side of the first pipe member; and
a valve unit integrated with catalysts disposed in the first channel, disposed on the first pipe member, and opening/closing the second channel in accordance with flow pressure of the exhaust gas.

20. The device of claim 19, wherein:
the first pipe member and the valve unit constitute a catalyst diluter that dilutes hydrogen in the exhaust gas using a reaction between the exhaust gas and the catalysts, and
the second pipe member forms an air diluter that dilutes hydrogen in the exhaust gas with external air.

* * * * *